United States Patent
Kumar et al.

(10) Patent No.: US 10,546,109 B2
(45) Date of Patent: Jan. 28, 2020

(54) SMART TOUCHSCREEN DISPLAY

(71) Applicant: QUALCOMM Incorporated, San Diego, CA (US)

(72) Inventors: Akash Kumar, Hyderabad (IN); Ankita, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 216 days.

(21) Appl. No.: 15/431,768

(22) Filed: Feb. 14, 2017

(65) Prior Publication Data

US 2018/0232506 A1 Aug. 16, 2018

(51) Int. Cl.

| G06F 21/32 | (2013.01) |
|---|---|
| G06F 3/0488 | (2013.01) |
| G06F 3/0481 | (2013.01) |
| G06F 3/041 | (2006.01) |
| G06K 9/00 | (2006.01) |
| G06F 21/62 | (2013.01) |
| H04L 29/06 | (2006.01) |

(52) U.S. Cl.
CPC ............. *G06F 21/32* (2013.01); *G06F 3/041* (2013.01); *G06F 3/0488* (2013.01); *G06F 3/04817* (2013.01); *G06F 21/629* (2013.01); *G06K 9/00013* (2013.01); *H04L 63/0861* (2013.01)

(58) Field of Classification Search
CPC ........ G06F 21/32; G06F 21/62; G06F 21/629; H04L 63/0861; G06K 9/00013
See application file for complete search history.

(56) References Cited

U.S. PATENT DOCUMENTS 9,432,366 B2 * 8/2016 Apostolos ........... H04L 63/0861
2007/0273658 A1 * 11/2007 Yli-Nokari ......... G06F 3/03547
345/173

(Continued)

FOREIGN PATENT DOCUMENTS

| CN | 202120198 U | 1/2012 | |
|---|---|---|---|
| WO | 2015005959 A1 | 1/2015 | |
| WO | WO-2015005959 A1 * | 1/2015 | ............. G06F 21/32 |

OTHER PUBLICATIONS

International Search Report and Written Opinion—PCT/US2018/017711—ISA/EPO—dated Apr. 24, 2018.

(Continued)

*Primary Examiner* — Nelson S. Giddins
(74) *Attorney, Agent, or Firm* — Muncy, Geissler, Olds & Lowe, P.C./Qualcomm (57) ABSTRACT

Techniques are disclosed for improving performance of a touchscreen device. In an aspect, the touchscreen device receives a selection of an application or function based on a user touching a portion of a touchscreen display of the touchscreen device that includes an icon representing the application or function, collects biometric data of the user based on the user touching the portion of the touchscreen display, and determines whether the user is authorized to access the application or function based on the biometric data. In an aspect, the touchscreen device detects that a portion of the touchscreen display is unresponsive to user touch input, and in response to the detection, moves at least one icon displayed on the unresponsive portion of the touchscreen display to a portion of the touchscreen display that is responsive to user touch input.

12 Claims, 9 Drawing Sheets

(56) References Cited

U.S. PATENT DOCUMENTS

| | | | |
|---|---|---|---|
| 2012/0068952 A1* | 3/2012 | Slaby | G01K 7/02 345/173 |
| 2013/0286042 A1 | 10/2013 | Ikeda et al. | |
| 2013/0326583 A1* | 12/2013 | Freihold | G06F 3/04815 726/3 |
| 2014/0298268 A1* | 10/2014 | Kang | G06F 3/04847 715/841 |
| 2014/0310788 A1* | 10/2014 | Ricci | G06F 16/583 726/6 |
| 2014/0320437 A1* | 10/2014 | Kang | G09G 5/373 345/173 |
| 2015/0052582 A1* | 2/2015 | Chow | G06F 21/629 726/3 |
| 2015/0135108 A1* | 5/2015 | Pope | G06K 9/00006 715/767 |
| 2015/0242673 A1* | 8/2015 | Singhal | G06K 9/00013 345/174 |
| 2016/0019547 A1* | 1/2016 | Gurnani | G06Q 20/40145 705/44 |
| 2016/0042166 A1* | 2/2016 | Kang | G06F 21/32 726/7 |
| 2016/0132139 A1* | 5/2016 | Du | G06F 3/0488 345/173 |
| 2016/0202866 A1 | 7/2016 | Zambetti et al. | |
| 2017/0300700 A1* | 10/2017 | Li | G06F 3/04883 |

OTHER PUBLICATIONS

Written Opinion of the International Preliminary Examing Authority—PCT/US2018/017711—IPEA/EPO—dated Jan. 21, 2019.

* cited by examiner

SMART TOUCHSCREEN DISPLAY

BACKGROUND

1. Field of the Disclosure

Aspects relate to a smart touchscreen display.

2. Description of the Related Art

Currently, biometric input (e.g., a fingerprint scan) is used merely to unlock a user device (e.g., smartphone, tablet computer, etc.) and not to restrict access to certain applications or functions to certain users when the device is used and shared by multiple users. Rather, to control access to different applications and functions, a user device can generally only provide profile based access, where each user will have their own unique profile on the device, and depending on which user unlocks the device, that user can use the applications he or she installed on the device. Other alternatives are to have a unique code to lock specific applications, but with the increasing number of applications and functionalities, it is difficult to store and maintain such authentication for every application and function.

SUMMARY

The following presents a simplified summary relating to one or more aspects disclosed herein. As such, the following summary should not be considered an extensive overview relating to all contemplated aspects, nor should the following summary be regarded to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of restricting access to an application or function of a touchscreen device includes receiving, at the touchscreen device, a selection of the application or function of the touchscreen device based on a user touching a portion of a touchscreen display of the touchscreen device that includes an icon representing the application or function of the touchscreen device, collecting, by the touchscreen device, biometric data of the user based on the user touching the portion of the touchscreen display of the touchscreen device that includes the icon representing the application or function of the touchscreen device, and determining, by the touchscreen device, whether or not the user is authorized to access the application or function of the touchscreen device based on the biometric data of the user.

In an aspect, a method for improving performance of a touchscreen device having a portion of a touchscreen display that is unresponsive to user touch input includes detecting, by the touchscreen device, that the portion of the touchscreen display is unresponsive to user touch input, and in response to the detection, moving, by the touchscreen device, at least one icon displayed on the unresponsive portion of the touchscreen display to a portion of the touchscreen display that is responsive to user touch input.

In an aspect, an apparatus for restricting access to an application or function of a touchscreen device includes at least one processor of the touchscreen device configured to: receive a selection of the application or function of the touchscreen device based on a user touching a portion of a touchscreen display of the touchscreen device that includes an icon representing the application or function of the touchscreen device, collect biometric data of the user based on the user touching the portion of the touchscreen display of the touchscreen device that includes the icon representing the application or function of the touchscreen device, and determine whether or not the user is authorized to access the application or function of the touchscreen device based on the biometric data of the user.

In an aspect, an apparatus for improving performance of a touchscreen device having a portion of a touchscreen display that is unresponsive to user touch input includes at least one processor of the touchscreen device configured to: detect that the portion of the touchscreen display is unresponsive to user touch input, and move, in response to the detection, at least one icon displayed on the unresponsive portion of the touchscreen display to a portion of the touchscreen display that is responsive to user touch input.

In an aspect, a non-transitory computer readable medium storing computer-executable instructions for restricting access to an application or function of a touchscreen device includes at least one instruction to cause the touchscreen device to receive a selection of the application or function of the touchscreen device based on a user touching a portion of a touchscreen display of the touchscreen device that includes an icon representing the application or function of the touchscreen device, at least one instruction to cause the touchscreen device to collect biometric data of the user based on the user touching the portion of the touchscreen display of the touchscreen device that includes the icon representing the application or function of the touchscreen device, and at least one instruction to cause the touchscreen device to determine whether or not the user is authorized to access the application or function of the touchscreen device based on the biometric data of the user.

In an aspect, a non-transitory computer-readable medium storing computer-executable instructions for improving performance of a touchscreen device having a portion of a touchscreen display that is unresponsive to user touch input includes at least one instruction to cause the touchscreen device to detect that the portion of the touchscreen display is unresponsive to user touch input, and at least one instruction to cause the touchscreen device to move, in response to the detection, at least one icon displayed on the unresponsive portion of the touchscreen display to a portion of the touchscreen display that is responsive to user touch input.

Other objects and advantages associated with the aspects disclosed herein will be apparent to those skilled in the art based on the accompanying drawings and detailed description.

BRIEF DESCRIPTION OF THE DRAWINGS

A more complete appreciation of aspects of the disclosure will be readily obtained as the same becomes better understood by reference to the following detailed description when considered in connection with the accompanying drawings which are presented solely for illustration and not limitation of the disclosure, and in which.

DETAILED DESCRIPTION

Techniques are disclosed for restricting access to an application or function of a touchscreen device. In an aspect, the touchscreen device receives a selection of the application or function of the touchscreen device based on a user touching a portion of a touchscreen display of the touchscreen device that includes an icon representing the application or function of the touchscreen device, collects biometric data of the user based on the user touching the portion of the touchscreen display of the touchscreen device that includes the icon representing the application or function of the touchscreen device, and determines whether or not the user is authorized to access the application or function of the touchscreen device based on the biometric data of the user.

Techniques are also disclosed for improving performance of a touchscreen device having a portion of a touchscreen display that is unresponsive to user touch input. In an aspect, the touchscreen device detects that the portion of the touchscreen display is unresponsive to user touch input, and in response to the detection, moves at least one icon displayed on the unresponsive portion of the touchscreen display to a portion of the touchscreen display that is responsive to user touch input.

These and other aspects of the disclosure are disclosed in the following description and related drawings directed to specific aspects of the disclosure. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "touchscreen device," "smartphone," "user device," "mobile device," and the like refer to any of a variety of mobile computing devices that include a touchscreen display, such as cellular telephones, tablet computers, personal data assistants (PDAs), wearable device (e.g., watch, head mounted display, virtual reality glasses, etc.), palm-top computers, notebook computers, laptop computers, wireless electronic mail receivers and cellular telephone receivers, multimedia Internet enabled cellular telephones, multimedia enabled smartphones (e.g., Android® and Apple iPhone®), and similar electronic devices that include a programmable processor, memory, and a touchscreen display/user interface.

Figure 1A:
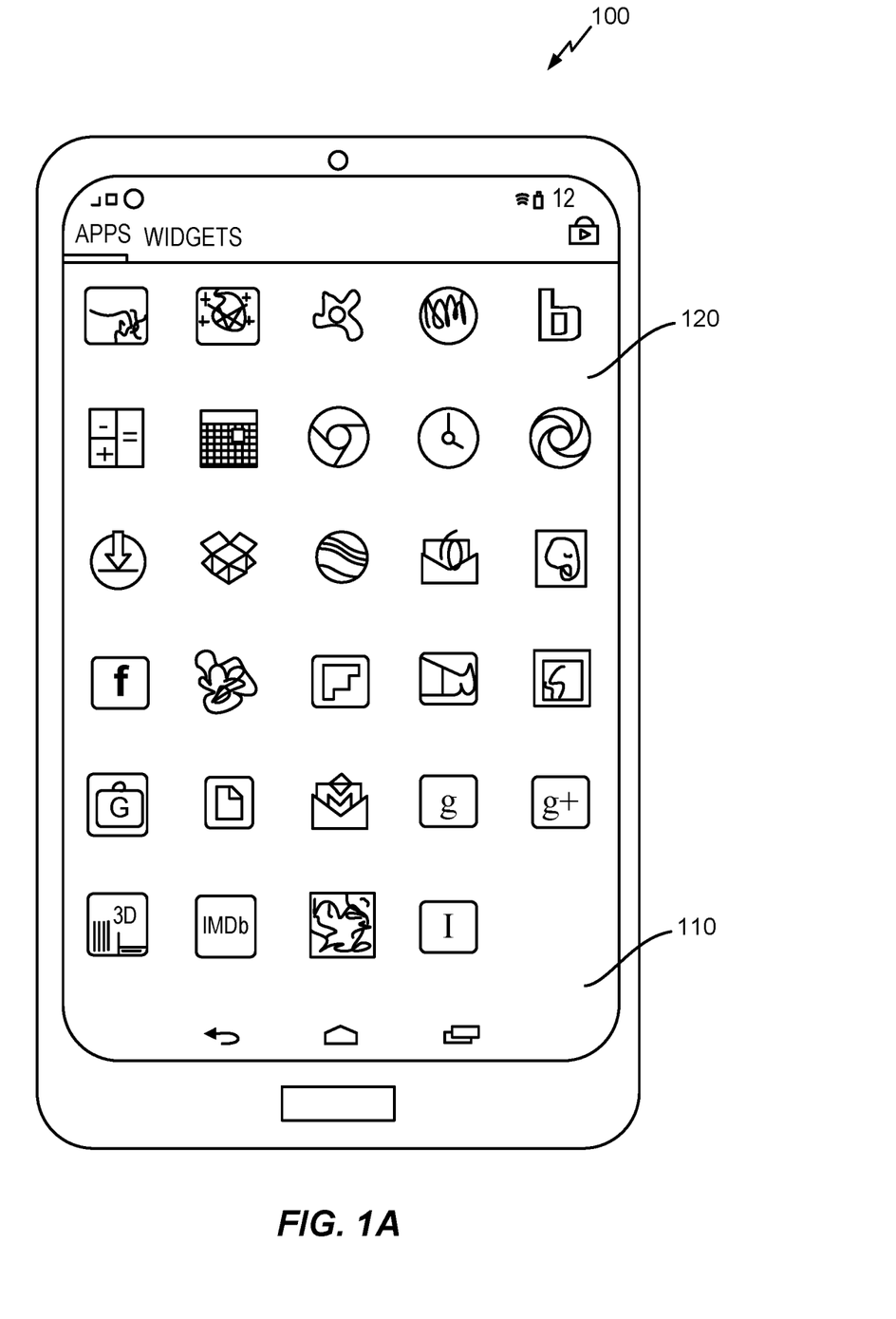
FIGS. 1A and 1B illustrate an exemplary touchscreen device in which aspects of the disclosure can be implemented.
Figure 1B:
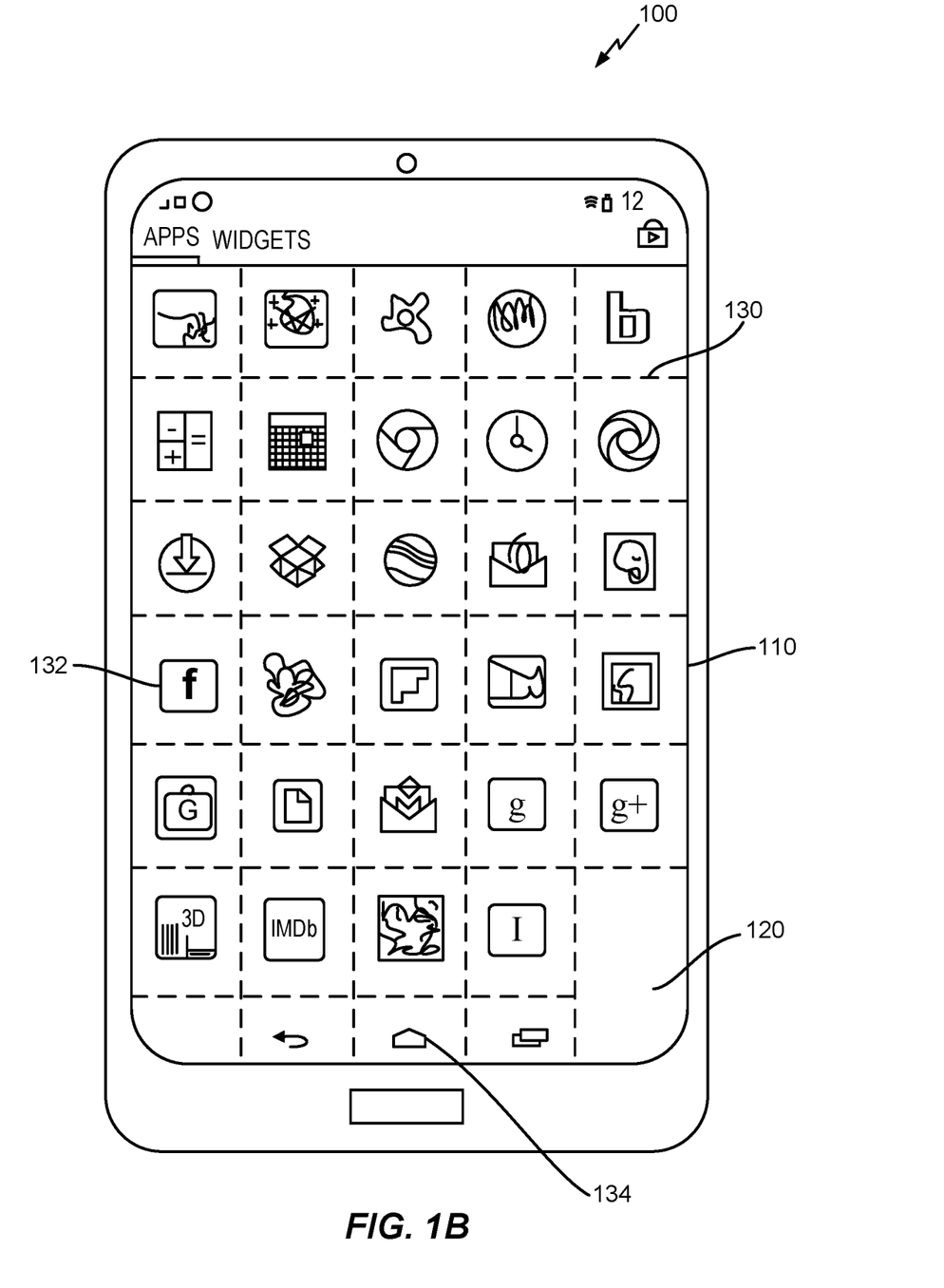

FIGS. 1A and 1B illustrate an exemplary touchscreen device 100 in which aspects of the disclosure can be implemented. Touchscreen device 100 includes a touchscreen display 110, which may be a light emitting diode (LED) display, a liquid crystal display (LCD) (e.g., active matrix, passive matrix) and the like. Alternatively, the display device 160 may be a monitor such as a monochrome display, color graphics adapter (CGA) display, enhanced graphics adapter (EGA) display, variable-graphics-array (VGA) display, super VGA display, cathode ray tube (CRT), and the like. The display device may also correspond to a plasma display or a display implemented with electronic inks.

The touchscreen display 110 may generally be configured to display a graphical user interface (GUI) 120 that enables interaction between a user of the touchscreen device 100 and the operating system or applications running thereon. The GUI 120 may represent applications, files, and operational options with graphical images. The graphical images may include windows, fields, dialog boxes, menus, icons, buttons, cursors, scroll bars, etc. Such images may be arranged in predefined layouts, or may be created dynamically to serve the specific actions being taken by a user. During operation, the user may select and activate various graphical images in order to initiate functions and tasks associated therewith. By way of example, a user may select a button that opens, closes, minimizes, or maximizes a window, or an icon that launches a particular application. In the example of FIG. 1A, the GUI 120 may display a plurality of icons representing various applications installed on the touchscreen device 100 in a grid pattern.

As noted above, biometric input (e.g., a fingerprint scan) is used merely to unlock a user device and not to restrict access to certain applications or functions to certain users when the device is used and shared by multiple users. Rather, to control access to different applications and functions, a user device can generally only provide profile based access, where each user has their own unique profile on the device, and depending on which user unlocks the device, that user can use the applications he or she installed on the device. Accordingly, the present disclosure provides a mechanism to enable a user device (e.g., touchscreen device 100) to utilize the entire touchscreen (e.g., touchscreen display 110) as a biometric sensor, in addition to providing normal touch functionalities.

More specifically, as illustrated in FIG. 1B, the touchscreen display 110 can be divided into a grid 130 of multiple blocks. Each block of the grid 130 may correspond to a square or rectangular portion of the touchscreen display 110 within which an icon for an application (e.g., icon 132 for the Facebook® application) can be displayed, or within which an icon representing a function of the touchscreen device 100 (e.g., the "home" button 134) can be displayed. Each block of the grid 130 may be associated with a different biometric authentication that restricts access to the application or function currently displayed in that block to only authenticated users. Thus, depending on what applications and/or functions are currently displayed on the touchscreen display 110 and the user using the touchscreen device 100, the user will only be able to access the applications and/or functions allowed for that user. That is, when the user touches an icon representing an application or function, the touchscreen device 100 will read the user's fingerprint and, based on the authentication associated with the application or functionality represented by the icon currently displayed in that block of the touchscreen display 110, determine whether the user that touched the icon is the user authorized to execute the application or perform the functionality.

For example, for young children, a parent may wish to disable the touch capability of the touchscreen display 110 around the call button to prevent the child from accidentally making a call. As such, the parent can set the authentication associated with the block of the grid 130 containing the call button to only recognize the parent's fingerprint. Similarly, if the user does not want other users to be able to download content when the touchscreen device 100 is not connected to a wireless local area network (WLAN), the user can set the authentication associated with the block of the grid 130 containing the "Mobile Data ON" icon to only recognize the user's fingerprint.

The mechanism of the present disclosure can be extended to limit access to incoming calls from certain callers to only certain users. More specifically, when there is an incoming call to the touchscreen device 100, there will be an "Accept Call" icon (or some similar icon) displayed on one of the blocks of the grid 130. The "Accept Call" icon is associated with a specific caller, insofar as the call is an incoming call from that specific caller. The touchscreen device 100 can be configured so that only users authorized by the biometric authentication for the block displaying the "Accept Call" icon for the specific caller will be able to activate the "Accept Call" icon and accept the call. As an example, the primary user of the touchscreen device 100 may authorize other users to accept only calls from callers on their contact lists, and deny authorization for any calls from callers not on their contact lists. As other examples, the primary user may restrict other users from accepting calls from callers that are not in the primary user's contact list, or from callers that are not in a "family" group of the primary user's contacts, or for specific individual callers, or the like.

Figure 2:
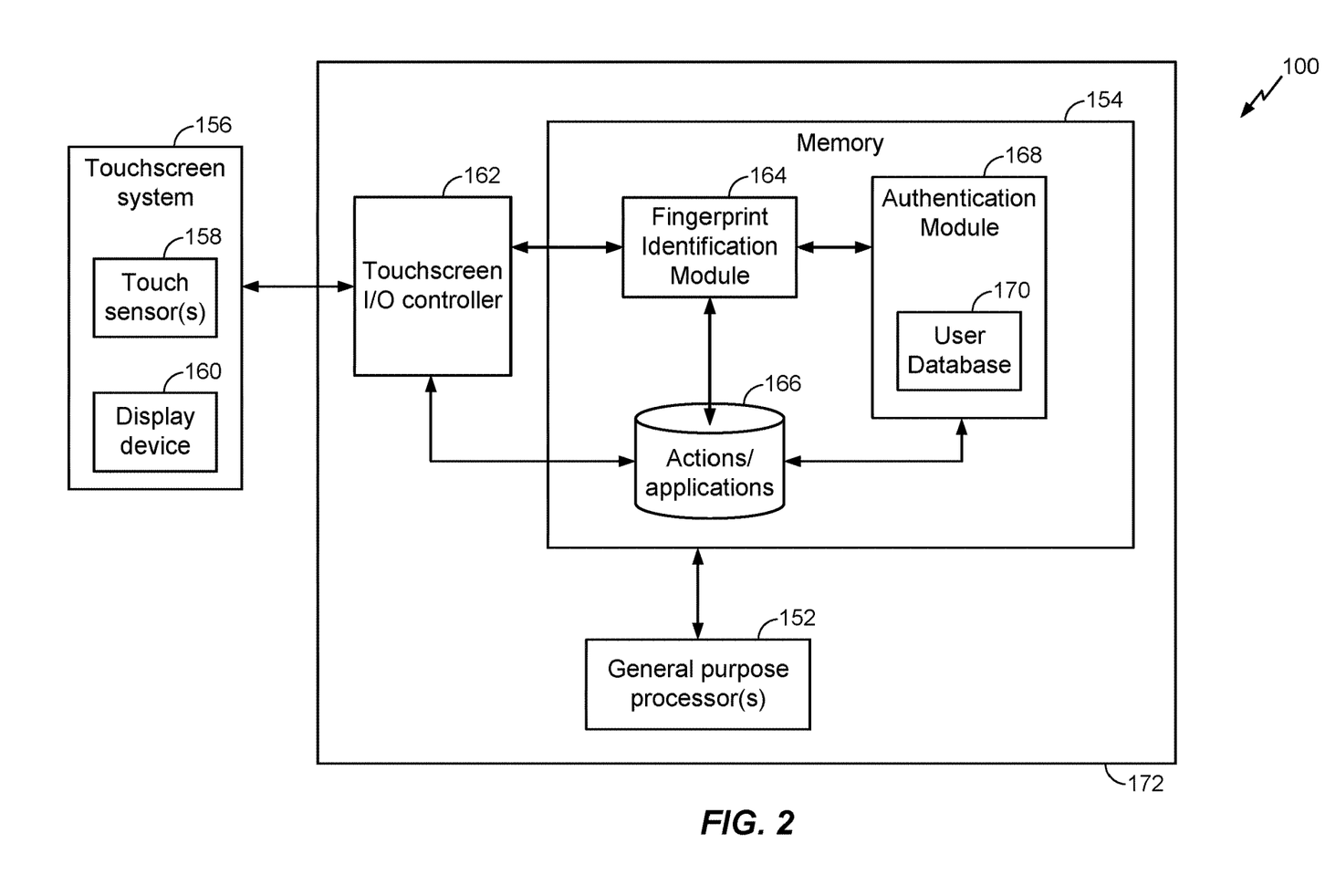
FIG. 2 is a functional block diagram of the touchscreen device showing elements that may be used for implementing a smart touchscreen display according to various aspects of the disclosure.

FIG. 2 is a functional block diagram of the touchscreen device 100 showing elements that may be used for implementing a smart touchscreen display according to various aspects of the disclosure. As shown, the touchscreen device 100 includes at least one controller, such as general purpose processor(s) 152, which may be coupled to at least one memory 154. The memory 154 may be a non-transitory tangible computer-readable storage medium that stores processor-executable instructions. The memory 154 may store the operating system (OS), as well as user application software and executable instructions. In some aspects, the general purpose processor(s) 152, memory 154, and a touchscreen I/O controller 162 may be included in a system-on-chip device 172.

The touchscreen device 100 may also include a touchscreen system 156 (also referred to as a "touchscreen" or "touchscreen display," and which may correspond to touchscreen display 110) that includes one or more touch sensor(s) 158 and a display device 160. The touch sensor(s) 158 may be configured to sense the touch contact caused by the user with a touch-sensitive surface. For example, the touch-sensitive surface may be based on capacitive sensing, optical sensing, resistive sensing, electric field sensing, surface acoustic wave sensing, pressure sensing and/or other technologies. The touchscreen system 156 may be configured to recognize touches, as well as the position and magnitude of touches on the touch sensitive surface.

The touch sensor(s) 158, or one or more biometric sensors (not shown) embedded in the display device 160, may also be configured to detect the fingerprint of the user's finger as it touches the touchscreen 156. For example, the touch sensor(s) 158 can recognize the user's fingerprint based on heat differentiation of the ridges and valleys of the user's fingerprint or based on optical imaging of the user's fingerprint, such as by an infrared (IR) source and detector, thermocouples, or a charge coupled device (CCD). As such, the touchscreen system 156 may be able to detect the user's fingerprint regardless of the location on the touchscreen system 156 that the user touches.

The display device 160 may be an LED display, an LCD, or the like. Alternatively, the display device 160 may be a monitor such as a monochrome display, CGA display, EGA display, VGA display, super VGA display, CRT, or the like. The display device 160 may also correspond to a plasma display or a display implemented with electronic inks. The display device 160 may generally be configured to display a GUI (e.g., GUI 120) that enables interaction between a user of the touchscreen device 100 and the operating system or applications running thereon.

The touchscreen system 156 may be coupled to the touchscreen input/output (I/O) controller 162 that enables input of information from the touch sensor(s) 158 (e.g., touch events) and output of information to the display device 160 (e.g., GUI presentation). The touchscreen I/O controller 162 may receive information from the touch sensor(s) 158 based on the user's touch, and may send the information to specific modules configured to be executed by the general purpose processor(s) 152 in order to interpret touch events, including single point touches and multipoint touches. The term "single point touch" as used herein refers to a touch event defined by interaction with a single portion of a single finger (or instrument), although the interaction could occur over time. Examples of single point touch input include a simple touch (e.g., a single tap), touch-and-drag, and double-touch (e.g., a double-tap—two taps in quick succession). A "multi-point touch" may refer to a touch event defined by combinations of different fingers or finger parts.

The touchscreen device 100 may include other I/O devices that, in combination with or independent of the touchscreen system 156, may be configured to transfer data into the touchscreen device 100. For example, the touchscreen I/O controller 162 may be used to perform tracking and to make selections with respect to the GUI on the display device 160, as well as to issue commands Such commands may be associated with zooming, panning, scrolling, paging, rotating, sizing, etc. Further, the commands may also be associated with launching a particular application, opening a file or document, viewing a menu, making a selection, executing instructions, logging onto the touchscreen device 100, loading a user profile associated with a user's preferred arrangement, etc.

As will be appreciated, there may be a primary user, or "administrator," for the touchscreen device 100. This primary user may determine which applications and/or functions to restrict and which users may access the restricted applications and/or functions. By only restricting certain applications or functions, all other applications and functions of the touchscreen device 100 will be unrestricted. Alternatively, the primary user can allow other users of the touchscreen device 100 to restrict applications and/or functions that they install on the touchscreen device 100.

For restricted applications and/or functionalities, the touchscreen device 100 can enter a "learn mode" in which the primary user can select which applications and/or functionalities of the touchscreen device 100 to restrict. The primary user can scan his or her fingerprint (or fingerprints), and data representing the scanned fingerprint(s) will be stored in a user database 170 with a user identifier for the primary user and a list of the restricted applications and/or functionalities the primary user is permitted to access (for the primary user, this would likely be "all" restricted applications and/or functionalities). Other users permitted to access some or all of the restricted applications and/or functionalities can also scan their fingerprint(s), and data representing the scanned fingerprint(s) will be stored in the user database 170 with user identifiers for those users and a list of the restricted applications and/or functionalities that these users are permitted to access. Note that the list of applications and/or functions stored for a user in the user database 170 may be a list of all applications and/or functions that the user is permitted to access, a list of the applications and/or functions that the user is not permitted to access, a list of the restricted applications and/or functions that the user is permitted to access, or any other list that can be used to determine whether the user is permitted to access a given application or function of the touchscreen device 100.

Thus, when touch input is received through the touchscreen I/O controller 162, a fingerprint identification module 164 may identify the fingerprint of the fingertip touching the display device 160 based on information detected by the touch sensor(s) 158. An authentication module 168 can determine which block of the grid 130 is being touched by the user and what application or function is being represented by the icon currently displayed in that block (if any—the user may not be touching an icon or intending to provide input to the display device 160). The authentication module 168 may obtain this information from the touchscreen I/O controller 162. The authentication module 168 can determine which user is touching the display device 160 by looking up the detected fingerprint in the user database 170. The authentication module 168 can then determine whether the user touching the display device 160 is authorized to access the application or function represented by the icon currently displayed in the touched block by looking up in the user database 170 the applications and/or function that the user is authorized to access. If the user is authorized, the authentication module 168 permits the user to access the application or function. If the user is not authorized, the authentication module 168 blocks the application of function from being performed.

Note that because the authentication module 168 determines whether the user touching the display device 160 is authorized to access the application or function represented by the icon currently displayed in the touched block, the authentication is specific to the application or function, not to the block of the grid. Thus, a user cannot simply move the icon to a different area of the display device 160 in order to defeat the authentication associated with the application or function. In addition, because the authentication is associated with the icon currently displayed in the touched block, the authentication required for a particular block of the grid can change based on the GUI changing. For example, if a user navigates from one screen of the GUI to another, some or all of the icons displayed on the screen will change, and therefore, the authentications associated with the blocks of the grid may also change.

Referring to the parent-child example discussed above, a parent may be the primary user (because the touchscreen device 100 belongs to that parent), and the other parent and the children may be secondary users. The primary parent can select the "Accept Call" function for all incoming calls as the restricted function of the touchscreen device 100, and can scan his or her fingerprint (or fingerprints). Data representing the scanned fingerprint(s) will be stored in the user database 170 with a user identifier for the primary parent and a list of at least the "Accept Call" function. The primary parent may ask the other parent to scan his or her fingerprint(s) and give the other parent access to the restricted function, i.e., the "Accept Call" function for all incoming calls. Specifically, the touchscreen device 100 will store data representing the other parent's scanned fingerprint(s) in the user database 170 with a user identifier for the other parent and a list of at least the "Accept Call" function for all incoming calls. Thus, both parents will have access to the "Accept Call" function of the touchscreen device 100 for all incoming calls. However, because there will not be any entries in the user database for the parents' children, the children will not have access to the "Accept Call" function, and will therefore not be able to answer any calls.

Alternatively, the primary parent may permit the children to access the "Accept Call" function for all calls from callers in a "family" group of contacts in the primary parent's contact list. As such, the primary parent can select the "Accept Call" function for incoming calls from all callers as one restricted function of the touchscreen device 100 (as above), and select the "Accept Call" function for incoming calls from callers in the "family" group as another restricted function. The primary parent can instruct the children to scan their fingerprint(s). The touchscreen device 100 will store data representing the children's scanned fingerprint(s) in the user database 170 with user identifiers for each child and a list of at least the "Accept Call" function for all incoming calls from contacts in the "family" group. Thus, both parents will have access to the "Accept Call" function of the touchscreen device 100 for all incoming calls, and the children will only have access to the "Accept Call" function for incoming calls from callers in the "family" group. In this way, the children will be able to accept a call from a family member, but will be blocked from answering calls from non-family members.

As is well-known to many users of touchscreen devices, such as touchscreen device 100, the touchscreen display 110 may become damaged. For example, an icon being displayed on the touchscreen display 110 may become unresponsive due to pixels aging over time and turning black, or the touchscreen display 110 may be cracked, such that icons displayed under or near the crack are unresponsive, or the like. Currently, if a part of the touchscreen display 110 is damaged such that the touchscreen display 110 is no longer responsive to the user's touch, then the user will not be able to use any functions or applications linked to the icons displayed in the unresponsive portion of the touchscreen display 110.

To address this issue, the present disclosure proposes a mechanism to flexibly shift or adjust the GUI 120 such that the applications and/or functions represented by icons displayed in the unresponsive portion of the touchscreen display 110 (or display device 160) are instead displayed in the portion of the touchscreen display 110 that is still responsive to user touch. More specifically, when a portion of the touchscreen display 110 is unresponsive to the user's touch, the touchscreen device 100 can determine the coordinates of the unresponsive portion of the touchscreen display 110. The touchscreen device 100 may determine which portion of the touchscreen display 110 is unresponsive based on the touch sensor(s) 158 detecting that user touch is no longer being sensed in a certain portion of the touchscreen display 110 (i.e., the damaged portion). Alternatively, or additionally, the touchscreen device 100 may determine which portion of the touchscreen display 110 is unresponsive by prompting the user to swipe his or her finger across the entire touchscreen display 110, thereby determining in which portion of the touchscreen display 110 the touch sensor(s) 158 cannot detect the user's touch. In response to identifying the unresponsive portion of the touchscreen display 110, the touchscreen device 100 will intelligently adjust the GUI 120 in such a way that all icons displayed on the touchscreen display 110 will be available to the user.

Figure 3A:
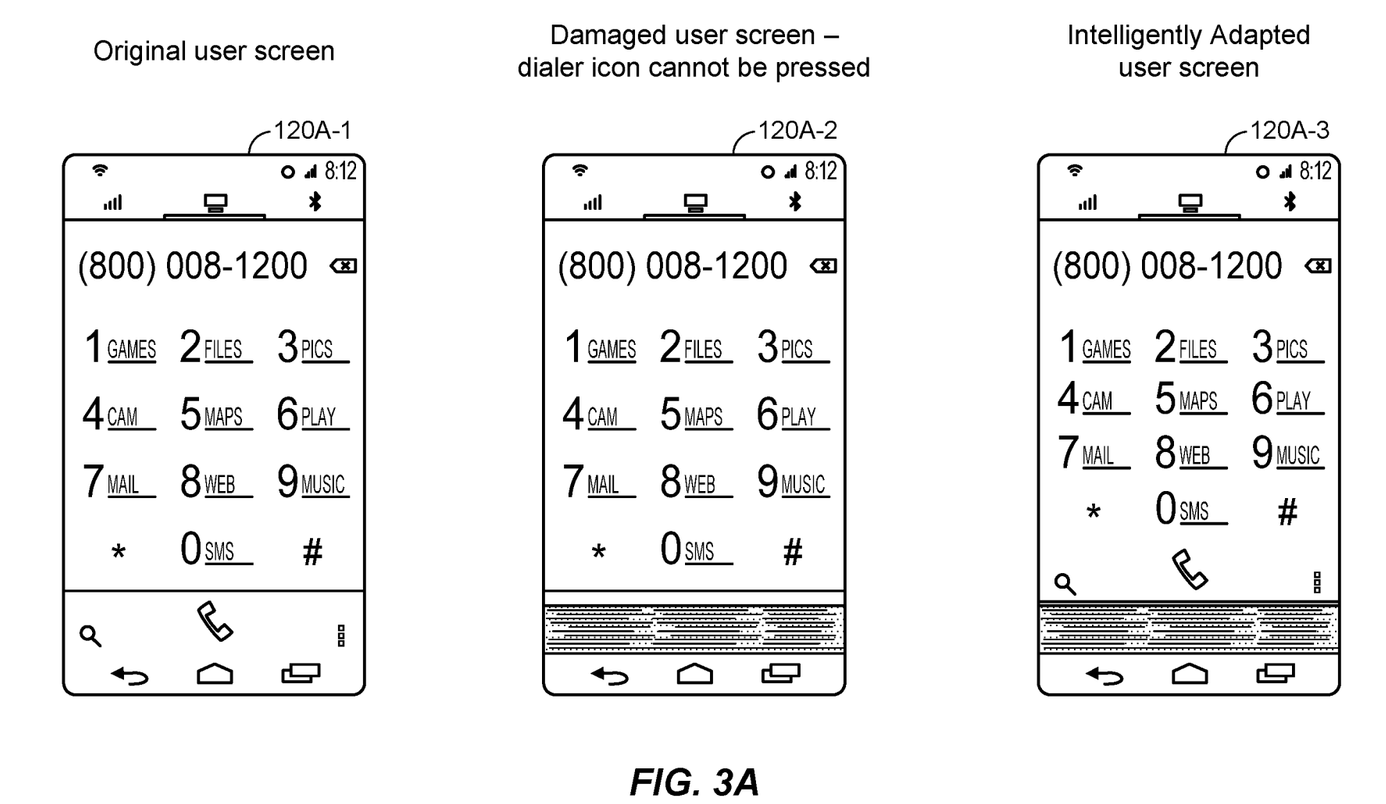
FIGS. 3A and 3B illustrate examples of how a graphical user interface (GUI) of a touchscreen device can be adjusted to accommodate an unresponsive portion of the touchscreen display according to an aspect of the disclosure.

FIGS. 3A and 3B illustrate examples of how the GUI 120 can be adjusted to accommodate an unresponsive portion of the touchscreen display 110 according to an aspect of the disclosure. Referring to FIG. 3A, a GUI 120A-1 is shown that represents the original, or fully functional, version of the touchscreen display 110. FIG. 3A further illustrates a GUI 120A-2 in which the portion of the GUI 120A-2 that displays the dialer icon has become unresponsive. To address this issue, as a first option, a GUI 120A-3 is shown in which the size of the GUI 120A-3 has been reduced to fit the responsive portion of the GUI 120A-3. For example, the size of the keypad can be reduced in order to permit the dialer icon to fit in the responsive portion of GUI 120A-3. Alternatively, the location of the dialer icon can be moved. For example, the dialer icon can be shifted left, right, up, or down so as to be located on the responsive portion of the GUI 120A-3.

Figure 3B:
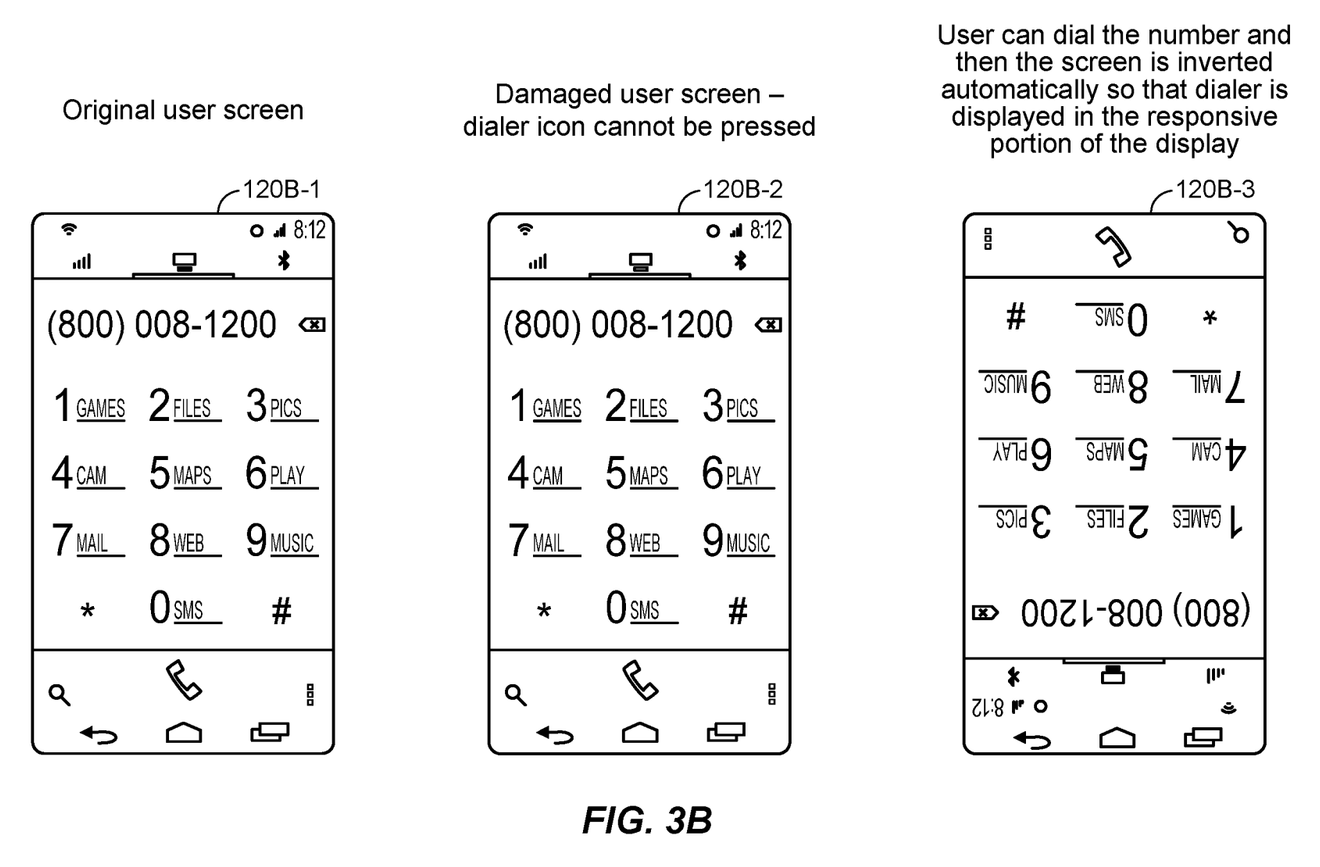

As another example, referring to FIG. 3B, a GUI 120B-1 is shown that represents the original, or fully functional, version of the touchscreen display 110. FIG. 3B further illustrates a GUI 120B-2 in which the portion of the GUI 120B-2 that displays the dialer icon has become unresponsive, similar to GUI 120A-2 in FIG. 3A. To address this issue, a GUI 120B-3 is shown in which the user can dial the number, and then the GUI 120B-3 is inverted so that the dialer icon is moved to the responsive portion of the GUI 120A-3.

As will be appreciated, how the GUI 120 is adjusted is dependent on the icons currently being displayed on the touchscreen display 110. Thus, in some cases, the size of the GUI 120 may be reduced to fit the responsive portion of the touchscreen display 110, in other cases the orientation of the GUI 120 may be inverted, and in other cases the icons displayed in the unresponsive portion of the GUI 120 are moved to the responsive portion of the GUI 120.

In an aspect, the touchscreen display 110 need not be unresponsive to adjust the GUI 120. Rather, if the battery level of the touchscreen device 100 drops below some low battery threshold (e.g., 10%), the size of the GUI 120 may be reduced in order to save power.

Figure 4:
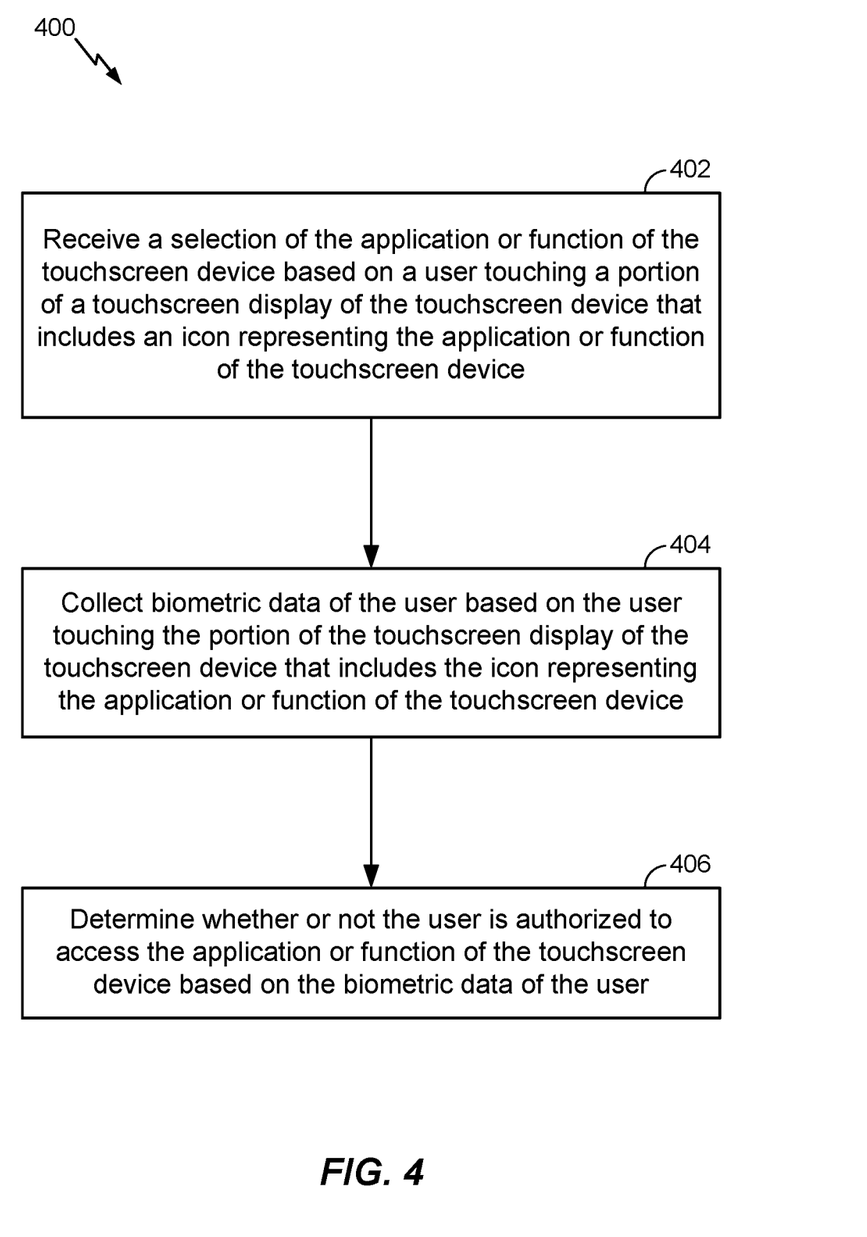
FIG. 4 illustrates an exemplary flow 400 for access to an application or function of a touchscreen device.

FIG. 4 illustrates an exemplary flow 400 for restricting access to an application or function of a touchscreen device. The flow 400 may be performed by the touchscreen device 100. More specifically, the flow 400 may be performed by various components of the touchscreen device 100 illustrated in FIG. 2.

At 402, the touchscreen device 100 (e.g., the processor 152 in conjunction with the touchscreen I/O controller 162) receives a selection of the application or function of the touchscreen device 100 based on a user touching a portion of a touchscreen display (e.g., display device 160) of the touchscreen device 100 that includes an icon (e.g., icon 132) representing the application or function of the touchscreen device 100.

At 404, the touchscreen device 100 (e.g., the processor 152 in conjunction with the touch sensor(s) 158 and the touchscreen I/O controller 162) collects biometric data of the user based on the user touching the portion of the touchscreen display (e.g., display device 160) of the touchscreen device 100 that includes the icon (e.g., icon 132) representing the application or function of the touchscreen device 100.

At 406, the touchscreen device 100 (e.g., the processor 152 in conjunction with fingerprint identification module 164, the authentication module 168, and the user database 170) determines whether or not the user is authorized to access the application or function of the touchscreen device 100 based on the biometric data of the user.

Figure 5:
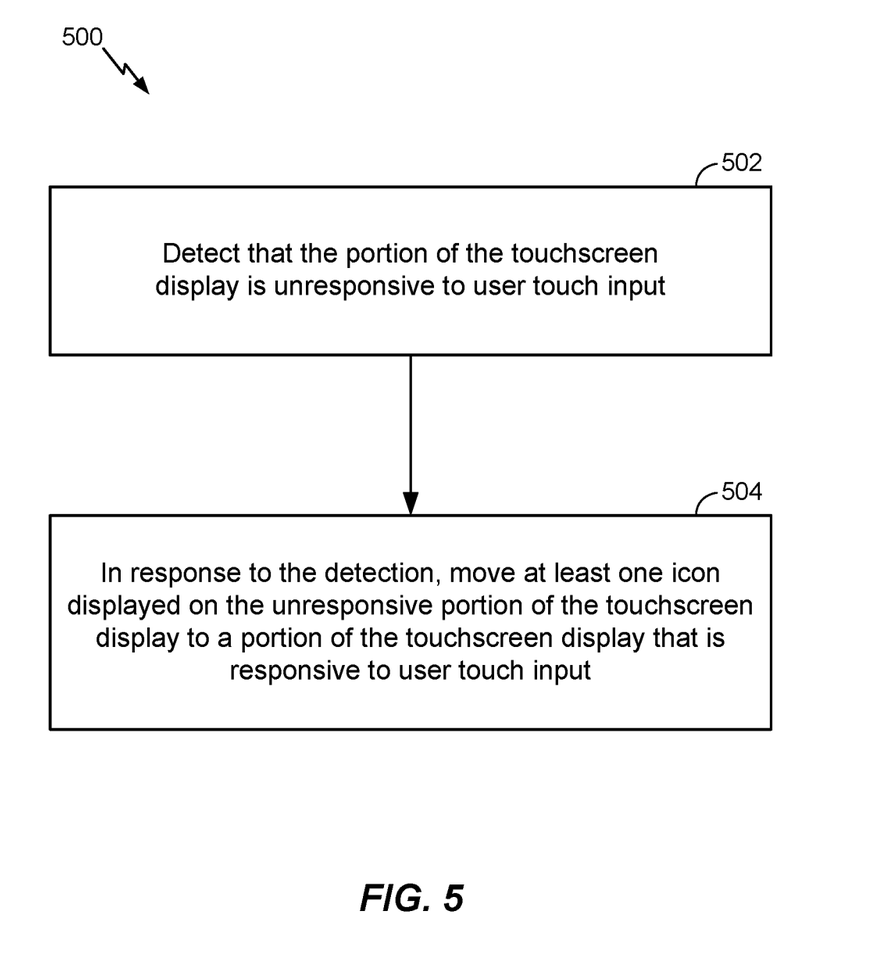
FIG. 5 illustrates an exemplary flow for improving performance of a touchscreen device having a portion of a touchscreen display that is unresponsive to user touch input.

FIG. 5 illustrates an exemplary flow 500 for improving performance of a touchscreen device having a portion of a touchscreen display that is unresponsive to user touch input. The flow 500 may be performed by the touchscreen device 100. More specifically, the flow 500 may be performed by various components of the touchscreen device 100 illustrated in FIG. 2.

At 502, the touchscreen device 100 (e.g., the processor 152 in conjunction with the touch sensor(s) 158, the display device 160, and/or the touchscreen I/O controller 162) detects that the portion of the touchscreen display (e.g., display device 160) is unresponsive to user touch input, as discussed above with reference to FIGS. 3A and 3B.

At 504, the touchscreen device 100 (e.g., the processor 152 in conjunction with the display device 160 and the touchscreen I/O controller 162), in response to the detection, moves at least one icon (e.g., icon 132) displayed on the unresponsive portion of the touchscreen display (e.g., display device 160) to a portion of the touchscreen display (e.g., display device 160) that is responsive to user touch input, as discussed above with reference to FIGS. 3A and 3B.

Figure 6:
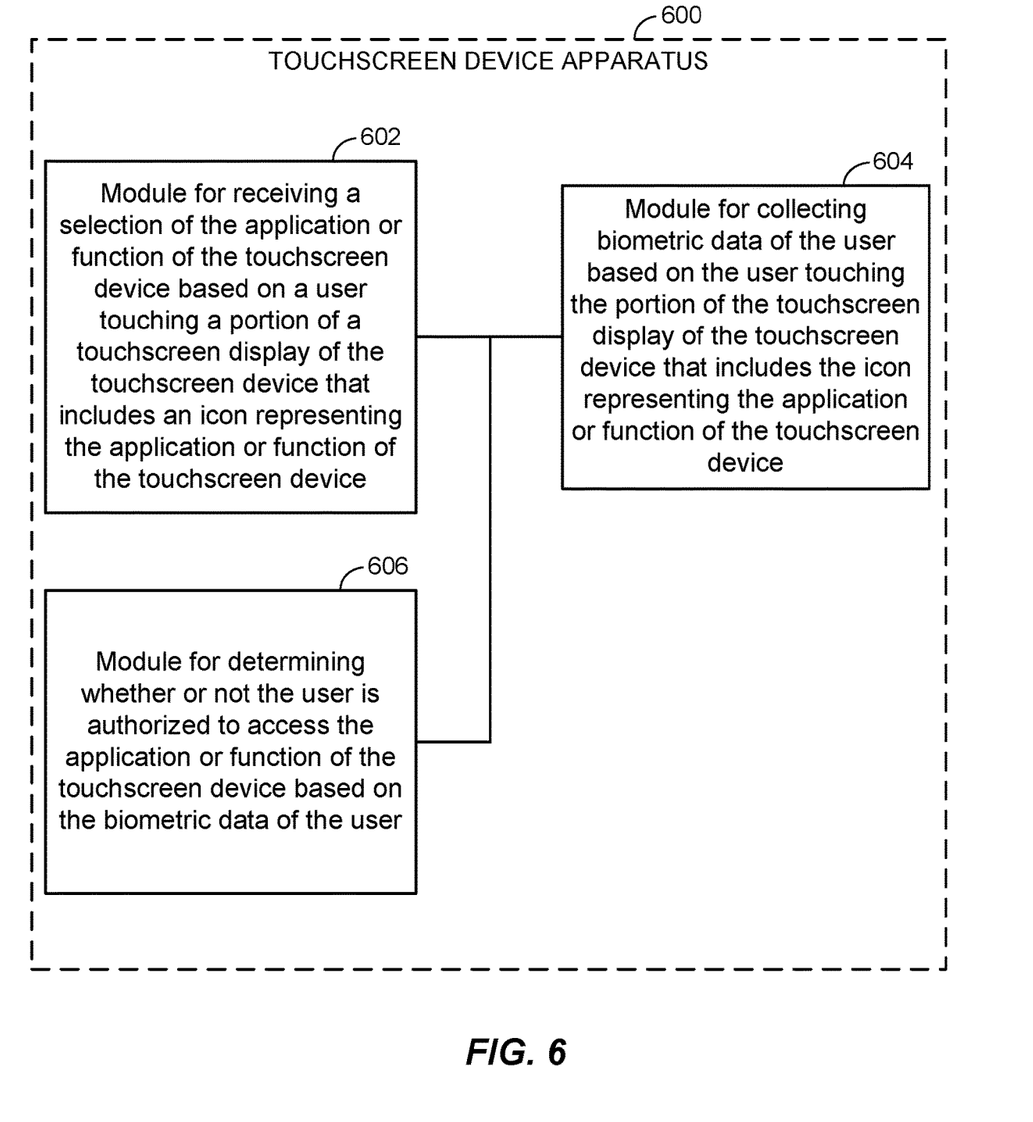
FIGS. 6-7 are simplified block diagrams of several sample aspects of apparatuses configured to support operations as taught herein.

FIG. 6 illustrates an example touchscreen device apparatus 600 represented as a series of interrelated functional modules. A module for receiving 602 may correspond at least in some aspects to, for example, a processing system, such as the processor 152 in conjunction with the touchscreen I/O controller 162, as discussed herein. A module for collecting 604 may correspond at least in some aspects to, for example, a processing system, such as the processor 152 in conjunction with the touch sensor(s) 158 and the touchscreen I/O controller 162, as discussed herein. A module for determining 606 may correspond at least in some aspects to, for example, a processing system, such as the processor 152 in conjunction with fingerprint identification module 164, the authentication module 168, and the user database 170, as discussed herein.

Figure 7:
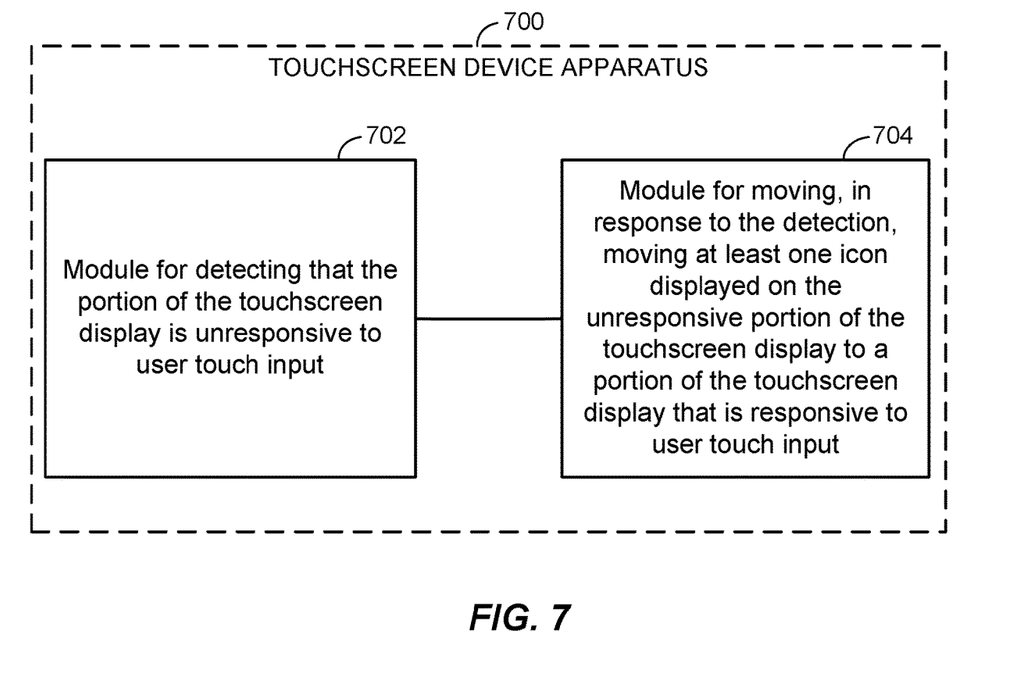

FIG. 7 illustrates an example touchscreen device apparatus 700 represented as a series of interrelated functional modules. A module for detecting 702 may correspond at least in some aspects to, for example, a processing system, such as the processor 152 in conjunction with the touch sensor(s) 158, the display device 160, and/or the touchscreen I/O controller 162, as discussed herein. A module for moving 704 may correspond at least in some aspects to, for example, a processing system, such as the processor 152 in conjunction with the display device 160 and the touchscreen I/O controller 162, as discussed herein.

The functionality of the modules of FIGS. 6-7 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIGS. 6-7, as well as other components and functions described herein, may be implemented using any suitable means. Such means also may be implemented, at least in part, using corresponding structure as taught herein. For example, the components described above in conjunction with the "module for" components of FIGS. 6-7 also may correspond to similarly designated "means for" functionality. Thus, in some aspects one or more of such means may be implemented using one or more of processor components, integrated circuits, or other suitable structure as taught herein.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., touchscreen device 100). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of restricting access to an application or function of a touchscreen device, comprising:
    detecting, by the touchscreen device, a user touching a portion of a touchscreen display of the touchscreen device, wherein the surface of the touchscreen display is divided into a grid;
    identifying, by the touchscreen device, at least one block of the grid that corresponds to the portion of the touchscreen display;
    identifying, by the touchscreen device, that an icon displayed in the at least one block of the grid represents the application or function of the touchscreen device;
    collecting, by the touchscreen device, biometric data of the user based on the user touching the portion of the touchscreen display of the touchscreen device; and
    determining, by the touchscreen device, whether or not the user is authorized to access the identified application or function of the touchscreen device being represented in the at least one block of the grid based on the biometric data of the user,
    wherein a plurality of applications or functions, each having an icon displayed in a block of the grid, are each associated with a biometric authentication of a different user.

2. The method of claim 1, wherein the determining comprises determining whether the user is authorized to access the application or function based on whether the biometric data matches a biometric authentication associated with the application or function.

3. The method of claim 2, wherein the biometric authentication is specific to the application or function regardless of the portion of the touchscreen display in which the icon is displayed.

4. The method of claim 1, further comprising determining an identity of the user touching the portion of the touchscreen display based on looking up the biometric data in a database of user profiles.

5. The method of claim 4, wherein the determining whether the user is authorized comprises determining whether the user is authorized to access the application or function based on a list of applications or functions of the touchscreen device that the user is authorized to access stored in the database of user profiles.

6. The method of claim 4, wherein the database of user profiles stores profiles for a plurality of users that are permitted to use the touchscreen device, and wherein each profile comprises a list of applications or functions of the touchscreen device that a user of the plurality of users is authorized to access.

7. The method of claim 1, further comprising granting access to the application or function based on the user being authorized to access the application or function.

8. The method of claim 1, wherein the biometric data comprises data representing a fingerprint of the user.

9. An apparatus for restricting access to an application or function of a touchscreen device, comprising:
    at least one processor of the touchscreen device configured to:
        detect a user touching a portion of a touchscreen display of the touchscreen device, wherein the surface of the touchscreen display is divided into a grid;
        identify at least one block of the grid that corresponds to the portion of the touchscreen display;
        identify that an icon displayed in the at least one block of the grid represents the application or function of the touchscreen device;
        collect biometric data of the user based on the user touching the portion of the touchscreen display of the touchscreen device; and
        determine whether or not the user is authorized to access the identified application or function of the touchscreen device being represented in the at least one block of the grid based on the biometric data of the user,
    wherein a plurality of applications or functions, each having an icon displayed in a block of the grid, are each associated with a biometric authentication of a different user.

10. The apparatus of claim 9, wherein the at least one processor is further configured to determine an identity of the user touching the portion of the touchscreen display based on looking up the biometric data in a database of user profiles.

11. The apparatus of claim 10, wherein the at least one processor being configured to determine whether the user is authorized comprises the at least one processor being configured to determine whether the user is authorized to access the application or function based on a list of applications or functions of the touchscreen device that the user is authorized to access stored in the database of user profiles.

12. The apparatus of claim 10, wherein the database of user profiles stores profiles for a plurality of users that are permitted to use the touchscreen device, and wherein each profile comprises a list of applications or functions of the touchscreen device that a user of the plurality of users is authorized to access.

* * * * *